United States Patent
Kang

(10) Patent No.: US 10,674,756 B2
(45) Date of Patent: Jun. 9, 2020

(54) VACUUM TYPE ROASTER

(71) Applicant: Kyoung Hoon Kang, Daegu (KR)

(72) Inventor: Kyoung Hoon Kang, Daegu (KR)

( * ) Notice: Subject to any disclaimer, the term of this patent is extended or adjusted under 35 U.S.C. 154(b) by 371 days.

(21) Appl. No.: 15/312,728

(22) PCT Filed: Sep. 13, 2016

(86) PCT No.: PCT/KR2016/010337
§ 371 (c)(1),
(2) Date: Jul. 10, 2017

(87) PCT Pub. No.: WO2017/048052
PCT Pub. Date: Mar. 23, 2017

(65) Prior Publication Data
US 2017/0295813 A1    Oct. 19, 2017

(30) Foreign Application Priority Data

Sep. 18, 2015  (KR) .................... 10-2015-0132294
Sep. 9, 2016   (KR) .................... 10-2016-0116642

(51) Int. Cl.
*F26B 11/04*   (2006.01)
*A23N 12/10*   (2006.01)

(52) U.S. Cl.
CPC ............ *A23N 12/10* (2013.01); *F26B 11/049* (2013.01); *F26B 11/04* (2013.01)

(58) Field of Classification Search
CPC ........... F26B 11/02; F26B 11/04; F26B 11/08; F26B 11/049; F26B 5/04
USPC ....... 99/427, 472, 477; 34/559, 92, 108, 109
See application file for complete search history.

(56) References Cited

U.S. PATENT DOCUMENTS

| 2,593,983 A | | 4/1952 | Chalupa | |
| 3,718,485 A | * | 2/1973 | Lankford | A23L 5/11 426/438 |
| 4,873,920 A | * | 10/1989 | Yang | A47J 27/0817 99/409 |

(Continued)

FOREIGN PATENT DOCUMENTS

| EP | 0599259 A1 * | 6/1994 | ............ F26B 11/022 |
| JP | H0560314 A   | 3/1993 | |

(Continued)

OTHER PUBLICATIONS

Supplementary European Search Report issued in European Patent Application No. 16846873 dated Feb. 18, 2019.

(Continued)

*Primary Examiner* — Reginald Alexander
(74) *Attorney, Agent, or Firm* — Marshall, Gerstein & Borun LLP

(57) ABSTRACT

Disclosed is a vacuum roaster including a chamber, a door cap formed on one side of the chamber so as to be opened or closed, a vacuum cap formed on an opposite side of the chamber, a basket spaced apart from an inner circumferential surface of the chamber, and including a basket door that is opened or closed for introduction and discharge of an object to be processed, a vacuum adjustment device for adjusting a vacuum state inside the chamber, a drive motor connected to the basket via a shaft for rotating the basket, and a heater provided inside the chamber so as to be spaced apart from the basket.

12 Claims, 3 Drawing Sheets

(56) References Cited

U.S. PATENT DOCUMENTS

| | | | | |
|---|---|---|---|---|
| 5,168,797 A | * | 12/1992 | Wang | A47J 27/0817 |
| | | | | 99/330 |
| 5,543,166 A | * | 8/1996 | Masel | A47J 37/047 |
| | | | | 426/438 |
| 6,708,603 B1 | * | 3/2004 | Li-Chen | A47J 37/047 |
| | | | | 99/330 |

FOREIGN PATENT DOCUMENTS

| | | |
|---|---|---|
| JP | H07180955 A | 7/1995 |
| JP | 2004105185 A | 4/2004 |
| JP | 2010119342 A | 6/2010 |
| KP | 20-0127338 Y1 | 10/1998 |
| KR | 10-0804835 B1 | 2/2008 |
| KR | 2009-0030655 A | 3/2009 |
| KR | 2009-0071868 A | 7/2009 |
| KR | 10-1222721 B1 | 1/2013 |
| KR | 10-1228614 B1 | 1/2013 |

OTHER PUBLICATIONS

Office Action issued in Japanese Patent Application No. 2018-507477 dated Aug. 31, 2018.
Office Action issued in Korean Patent Application No. 10-2016-0116642 dated Jan. 26, 2018.
International Search Report issued in PCT/KR2016/0101337 dated Jan. 10, 2017.

* cited by examiner

VACUUM TYPE ROASTER

TECHNICAL FIELD

The present disclosure relates to a vacuum roaster, and more particularly, to a vacuum roaster, which may effectively remove moisture from a material that is being roasted without generating smoke by maintaining the inside of a chamber in a vacuum state, and which may not need to cool a heated material or perform any additional process for removing byproducts, such as, for example, husks.

BACKGROUND

Generally, grains such as green coffee beans, tea leaves, and the like often undergo a process of being roasted at a high temperature in a device, such as, for example, a roaster while being processed. In particular, coffee is made using roasted and ground green beans, which are seeds of certain coffee trees, and is loved by many people owing to the excellent taste and scent thereof.

Since the coffee generates a taste and scent unique to coffee when green beans are roasted at a high temperature, it is difficult to sense the desired unique taste and scent in the green beans before roasting, and thus a process of roasting the green beans is required. The taste and scent of coffee may vary considerably depending on procedures or techniques of roasting green beans as well as the difference between the kinds of coffee beans. Therefore, various devices, roasters, and the like, which are used to roast green beans so as to achieve an excellent taste and scent, have been proposed.

Accordingly, a vacuum-roasting device has conventionally been used to roast green coffee beans. The vacuum-roasting device includes a main body having a funnel-shaped introduction port in the top thereof, a rotating drum rotatably installed in the main body so that green beans are supplied into the rotating drum through the introduction port, a motor for rotating the rotating drum, and a burner for heating the lower surface of the rotating drum by supplying heat to the inside of the main body.

However, the conventional device described above is configured to heat and roast the green beans inside the rotating drum using heat supplied from the burner. At this time, the heat supplied from the burner may be concentrated on a portion of the rotating drum, more particularly, the lower surface, and moreover, the lower surface of the rotating drum may be unevenly heated to different temperatures, which may make it impossible to evenly roast the green beans inside the rotating drum, resulting in deterioration in the quality of the coffee.

In addition, as disclosed in Korean Registered Patent NO. 10-0804835, a vacuum-roasting device and a vacuum-roasting method have recently been proposed. The vacuum-roasting device includes a vacuum chamber, which includes an inlet for the introduction of an object to be processed, an opening/closing member installed thereto for opening or closing the inlet, and an outlet for the discharge of the processed object, the outlet being opened or closed by a door, a rotating drum rotatably installed inside the vacuum chamber so that the object to be processed is supplied into the rotating drum through the inlet, a rotary motor for rotating the rotating drum, a vacuum supply unit for applying vacuum pressure to the vacuum chamber, and a heater installed to the vacuum chamber.

In the above Korean Registered Patent NO. 10-0804835, after the object to be processed is supplied into the rotating drum through the inlet, the opening or closing of which is automatically adjusted, a vacuum is created inside the vacuum chamber and the object to be processed is heated while the rotating drum is rotated. With this operation and due to the advantageous configuration in which a supply port, through which the object to be processed is supplied, is installed so as to be inclined downward, the efficiencies with which the vacuum state is maintained and the outward emission of scent is prevented may be increased and the object to be processed may be evenly heated and roasted. However, the configuration described above is suitable for a large roaster, in which an object to be processed, such as, for example, coffee beans, is roasted while being continuously supplied through an inlet, and is not suitable, for example, for the case of roasting coffee beans in order to make a small amount of coffee.

For this reason, the demand for a small roaster, which may roast coffee beans to allow people to enjoy more delicious coffee even in a small shop or at home, rather than a large shop in which coffee beans need to be constantly roasted in order to make a great amount of coffee, is increasing in accordance with the increased interest in coffee and the increase in the number of small coffee shops.

In addition, since conventionally proposed devices such as large roasters for roasting, for example, coffee beans, are adapted to continuously heat coffee beans within a rotating drum, the processed object, i.e. the coffee beans, which has completely been heated, needs to be discharged outward from the vacuum chamber and then be cooled in a separate device. In this case, the processed object needs to be subjected to an additional process of removing impurities, such as, for example, husks, generated while the coffee beans are roasted within the rotating drum. Therefore, in addition to a roaster for roasting the object to be processed, for example, a separate cooling device or an impurity removal device is required, which results in an increase in the overall volume of the roaster facility once installed.

SUMMARY

Therefore, the present disclosure has been made in view of the above problems, and it is an object of the presently described embodiments to provide a vacuum roaster, which may effectively remove moisture from a material that is being roasted without generating smoke by maintaining the inside of a chamber in a vacuum state, and which may not need to cool a heated material or perform any additional process for removing byproducts, such as, for example, husks.

In accordance with an aspect of the presently described embodiments, the above and other objects can be accomplished by the provision of a vacuum roaster including a chamber, a door cap formed on one side of the chamber so as to be opened or closed, a vacuum cap formed on an opposite side of the chamber, a basket spaced apart from an inner circumferential surface of the chamber, and including a basket door that is opened or closed for introduction and discharge of an object to be processed, a vacuum adjustment device for adjusting a vacuum state inside the chamber, a drive motor connected to the basket via a shaft for rotating the basket, and a heater provided inside the chamber so as to be spaced apart from the basket.

In accordance with the aspect of the presently described embodiments, the basket may be provided in an outer circumferential surface thereof with a discharge hole for discharging a byproduct of the object to be processed, which is generated while the object to be processed is being roasted.

In accordance with the aspect of the presently described embodiments, the discharge hole may be formed to have a diameter within a range from 1 mm to 10 mm.

In accordance with the aspect of the presently described embodiments, the basket may be provided thereunder with a dust box in which the byproduct of the object to be processed, which is discharged through the discharge hole, accumulates.

In accordance with the aspect of the presently described embodiments, vacuum adjustment device may include a vacuum pump for suctioning air inside the chamber, a water trap formed on a movement path of the air suctioned by the vacuum pump for condensing and collecting moisture contained in the suctioned air, and a vacuum gauge formed on the movement path for measuring a vacuum pressure inside the chamber.

In accordance with the aspect of the presently described embodiments, the vacuum roaster further includes a cooling coil formed in a coil shape for lengthening the movement path.

In accordance with the aspect of the presently described embodiments, the vacuum roaster may further include a filter formed inside the chamber for removing fine dust contained in gas generated inside the chamber.

In accordance with the aspect of the presently described embodiments, the chamber may be a cylindrical chamber having a circular cross section.

Other details of the embodiments according to various aspects of the presently described embodiments are included in the following detailed description.

According to the embodiment, for example, coffee beans may be roasted without burning in a vacuum state or at a negative pressure that may be simply realized using a vacuum pump. In addition, gas that may be generated while roasting is suctioned by the suction force of the vacuum pump, and thereafter is condensed and stored in a water trap, which may minimize the generation of unpleasant gases and may enable the precise adjustment of the temperature at which the coffee beans are to be roasted by a heater.

In addition, without requiring an expensive large roaster having a large volume and a complicated structure, a roaster may be constructed in a small space at low cost and may be simply used.

In addition, after the roasting performed by the heating of the heater ends, cooling at the room temperature may be successively performed inside the chamber, and byproducts, such as husks, generated upon roasting may be naturally discharged from the chamber without a separate process or device while the cooling is performed, which may improve the efficiency of roasting.

Meanwhile, when the chamber is a cylindrical chamber, the pressure resulting from the difference in pressure between the inside and the outside of the chamber while a vacuum is created in the chamber is evenly distributed to the cylindrical surface, whereby the shape of the chamber may be maintained.

DETAILED DESCRIPTION

The presently disclosed apparatus may be modified in various ways and may include various embodiments, and particular embodiments will be illustrated and described below in detail. However, the presently described embodiments are not limited to the particular embodiments described below, and should be understood as including all modifications, equivalents, and substitutions that fall within the scope and technical range of the present inventions.

The terminology used herein is for the purpose of describing particular example embodiments only and is not intended to be limiting. As used herein, the singular forms are intended to include the plural forms as well, unless the context clearly indicates otherwise. It will be further understood that the terms "comprises" or "includes" when used herein specify the presence of stated features, integers, steps, operations, elements, components or combinations thereof, but do not preclude the presence or addition of one or more other features, integers, steps, operations, elements, components or combinations thereof. Hereinafter, a vacuum roaster will be described with reference to the accompanying drawings.

Figure 1:
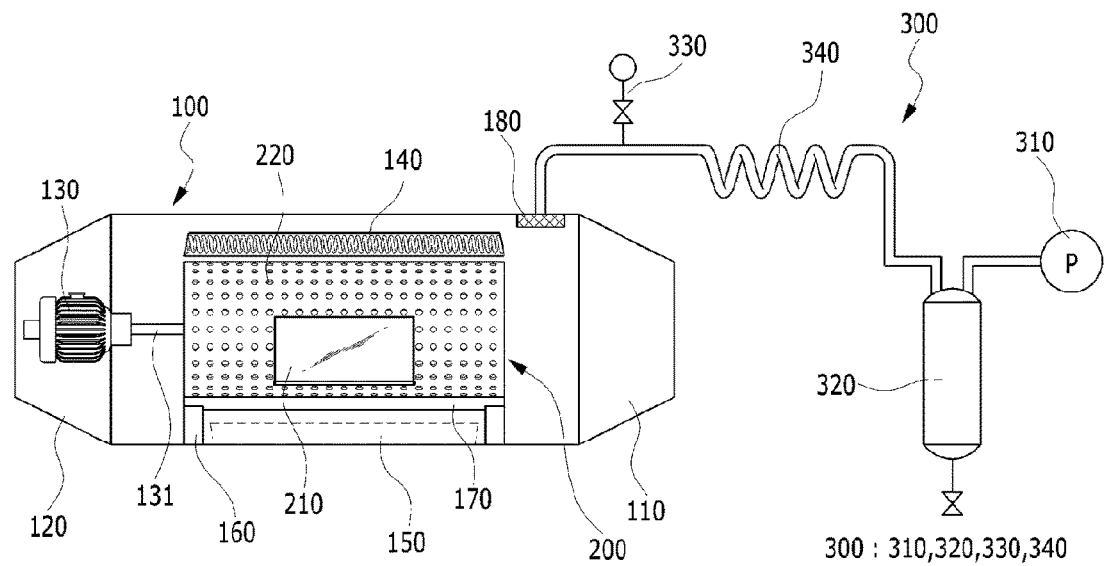
FIG. 1 is a view illustrating the overall configuration of a vacuum roaster according to an embodiment.
Figure 2:
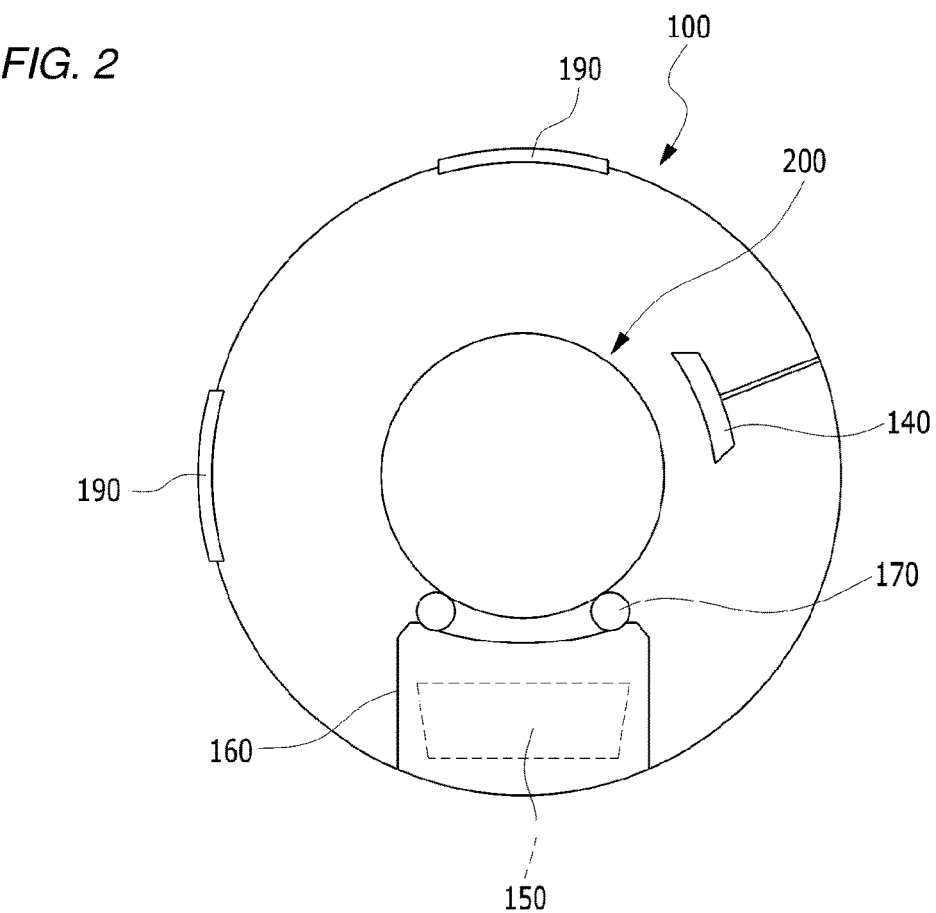
FIG. 2 is a view illustrating the inside of a chamber in the vacuum roaster according to the embodiment.
Figure 3:
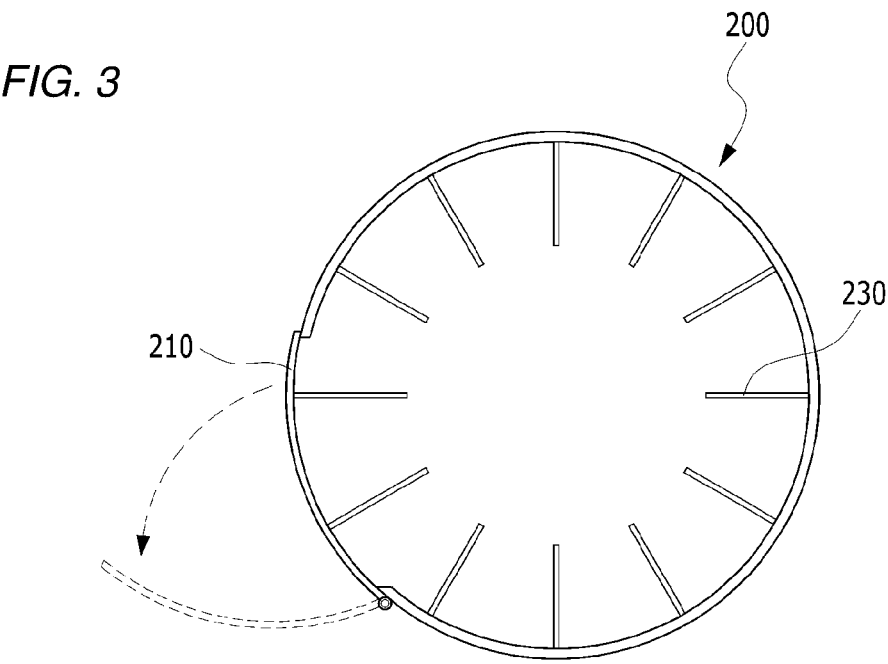
FIG. 3 is a view illustrating a basket installed inside the chamber.
Figure 4:
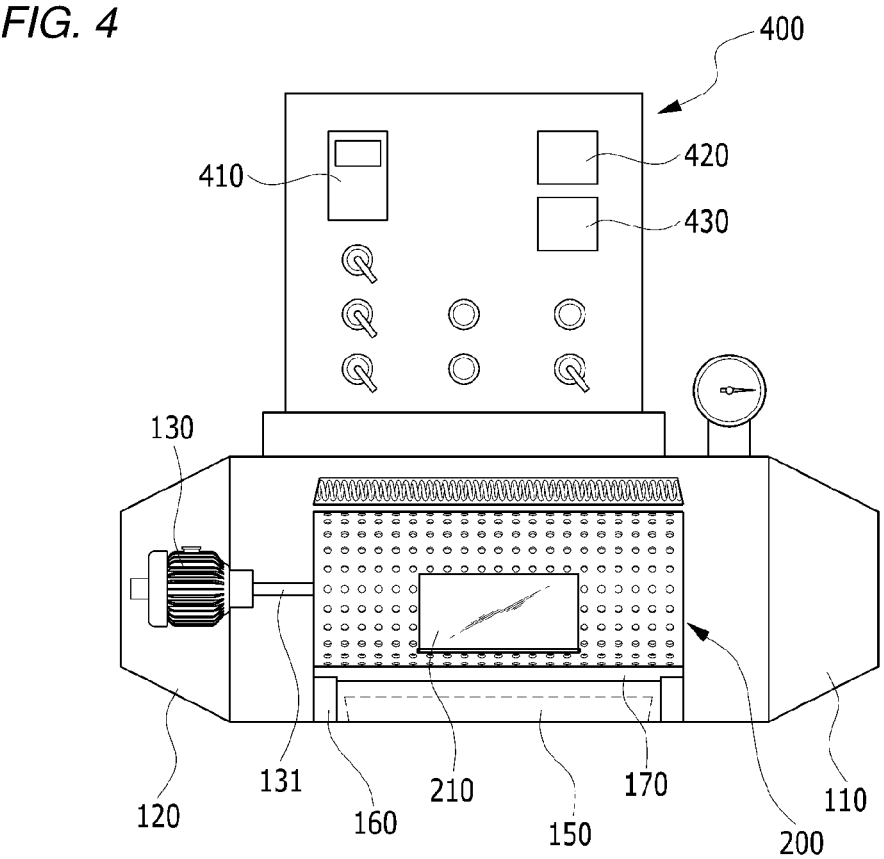
FIG. 4 is a view illustrating the outer shape of the vacuum roaster according to the embodiment.
Figure 5:
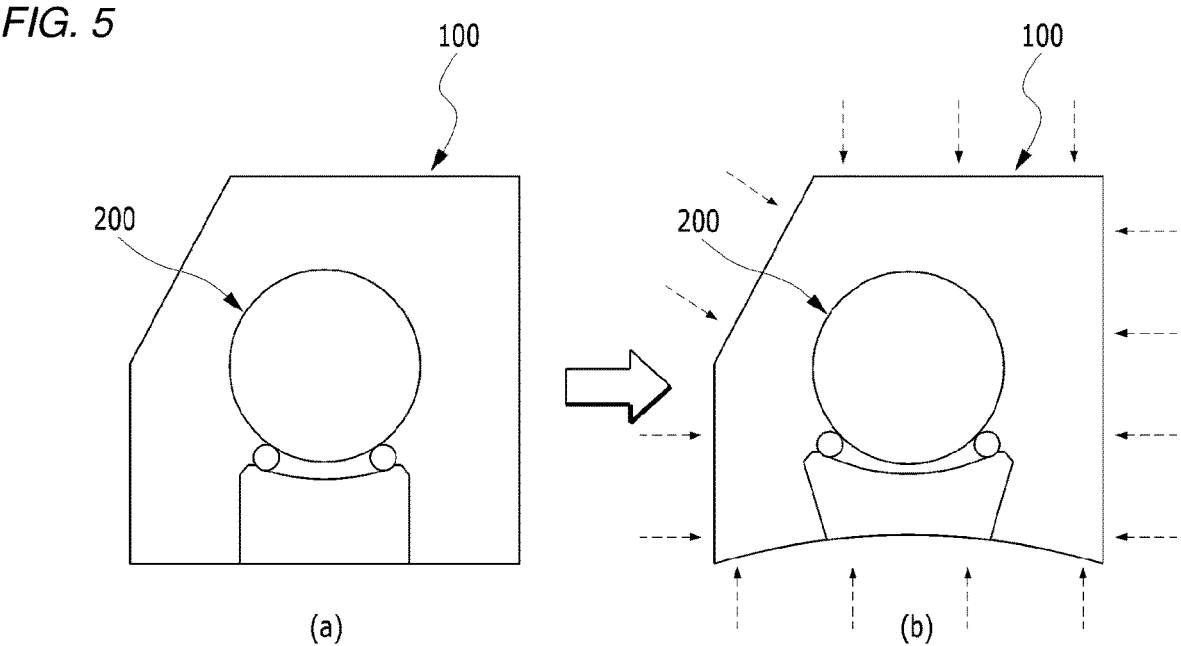
FIG. 5 is a view illustrating the shape of the chamber in the vacuum roaster according to another embodiment.

FIG. 1 is a view illustrating the overall configuration of a vacuum roaster according to an embodiment. FIG. 2 is a view illustrating the inside of a chamber in the vacuum roaster according to the embodiment. FIG. 3 is a view illustrating a basket installed inside the chamber. FIG. 4 is a view illustrating the outer shape of the vacuum roaster according to the embodiment. FIG. 5 is a view illustrating the shape of the chamber in the vacuum roaster according to another embodiment.

As illustrated in FIG. 1, the vacuum roaster according to the embodiment includes a chamber 100, a door cap 110 formed on one side of the chamber so as to be opened or closed, a vacuum cap 120 formed on the opposite side of the chamber, a basket 200 spaced apart from the inner circumferential surface of the chamber and provided with a basket door, which may be opened or closed for the introduction and discharge of an object to be processed, a vacuum adjustment device 300 for adjusting the vacuum state inside the chamber, a drive motor 130 connected to the basket via a shaft so as to rotate the basket, and a heater 140 provided inside the chamber so as to be spaced apart from the basket.

The chamber 100 is formed in the shape of a hollow tube, which defines a predetermined space therein. The cross section of the chamber may have a rectangular shape, a trapezoidal shape, or a circular shape. The chamber 100 may take the form of a cylinder having a circular cross section. This will be described later.

The door cap 110 is formed on one side of the chamber 100 so as to be opened or closed, and the vacuum cap 120 is formed on the opposite side of the chamber 100. The drive motor 130, which is connected to the basket 200 via the shaft, is installed on the side surface of the chamber 100. Due to the installation of the drive motor, a seal on the side surface of the chamber may be deteriorated. The vacuum cap 120 may be installed in order to prevent deterioration of the seal on the side surface of the chamber at which the drive motor is installed, and a sealing member (not illustrated)

may be formed on a portion at which the vacuum cap comes into contact with the chamber 100.

The basket 200 is provided inside the chamber 100 so as to be spaced apart from the inner circumferential surface of the chamber by a predetermined distance. When the basket 200 is installed separately inside the chamber 100 so as to be spaced apart from the inner circumferential surface of the chamber, a conventional phenomenon, by which an object to be processed, such as, for example, coffee beans, burns when coming into contact with the inner circumferential surface of a blocked chamber, may be prevented, which enables the roasting of more delicious coffee.

Meanwhile, a transparent window 190 may be formed in the outer circumferential surface of the chamber 100 and may be formed of a transparent material so as to enable a user to observe the inside of the chamber. The transparent window 190 is not strictly necessary, but may increase the satisfaction of the user by allowing the user to observe the roasting of the object to be processed from the outside.

In order to create negative pressure in the inner space of the chamber 100, the chamber 100 is provided with a passage, through which air or gas in the inner space of the chamber may move, and is connected to the vacuum adjustment device 300 through the passage.

Meanwhile, a filter 180 may be formed at the entrance of the passage that connects the chamber 100 and the vacuum adjustment device 300 to each other, and may serve to remove fine dust or fine byproducts, which are discharged through discharge holes 220 in the basket 200 or which float inside the chamber.

The filter 180 prevents, for example, fine dust inside the chamber from moving to the vacuum adjustment device 300, thereby preventing deterioration in the functionality of a water trap 320 or a vacuum pump 310, which constitutes the vacuum adjustment device 300.

When the vacuum adjustment device 300 is connected to the chamber 100 described above, the inside of the chamber 100 may be maintained in the vacuum state, i.e. at a negative pressure, while roasting is being performed, and then may be adjusted so as to again enter the same state as atmosphere pressure when an attempt is made to discharge, for example, coffee beans after roasting. In this way, the vacuum state may be appropriately maintained while roasting, which may prevent the scent of the coffee beans from being unnecessarily emitted outward.

As the result of connecting the vacuum adjustment device 300 to the chamber 100, unlike a conventional roaster in which a vacuum is generated within the rotating drum, the entire inside of the chamber may enter the vacuum state, i.e. may have a negative pressure, via simple manipulation of the vacuum pump. To this end, the chamber according to the embodiment may be configured as a small chamber, which may make it more easy to realize the vacuum state in the entire inside of the chamber, than a large chamber of the type applied to a conventional roaster.

The basket 200 is spaced apart from the inner circumferential surface of the chamber 100 and is provided on one surface thereof with a basket door 210 for the introduction and discharge of the object to be processed, such as, for example, coffee beans. In addition, the basket 200 is provided therein with a blade 230 for agitating the object to be processed, such as, for example, coffee beans.

The discharge holes 220 are formed in the outer circumferential surface of the basket 200 and have a predetermined shape, for example, a circular shape. The discharge holes 220 may be distributed over the entire outer circumferential surface of the basket 200. After the object to be processed, such as, for example, coffee beans, is introduced into the basket 200, byproducts such as husks of the coffee beans, generated while the coffee beans are heated and roasted, may be discharged outward through the discharge holes 220 when the basket 200 is rotated.

Meanwhile, because the air inside the basket 200 is also discharged through the discharge holes 220, a vacuum or negative pressure may also be created inside the basket when a vacuum or negative pressure is created inside the chamber 100. That is, the entire inside of the chamber may be in a vacuum state.

The diameter of the discharge holes 220 may be increased or decreased depending on the size of an object to be roasted, and may be within a range from about 1 mm to 10 mm in consideration of the size of normal coffee beans.

A dust box 150 may be installed below the basket 200, and the top of the dust box may be open so that byproducts such as husks from the object to be processed, such as, for example, coffee beans, generated while the coffee beans are roasted inside the basket, accumulate inside the dust box. The byproducts are discharged outward from the basket 200 through the discharge holes 220, and the discharged byproducts accumulate and are collected in the dust box 150, which is installed below the basket 200.

When the dust box 150 is provided below the basket 200 as described above, byproducts generated while roasting may be automatically separated from the basket 200 while the coffee beans are roasted or are cooled to the room temperature, without being processed by a separate husk separator or a husk separation process. The roasting byproducts may be easily discharged in such a manner of separating and emptying the dust box 150 during the cleaning of the inside of the chamber 100 or during the ventilation of the chamber 100.

Installation of the dust box 150 below the basket 200 is possible because the basket 200 is spaced apart from the inner circumferential surface of the chamber 100.

In addition, in order to install the basket 200 inside the chamber 100 so as to be spaced apart from the inner circumferential surface of the chamber 100, a support frame 160 for fixing the basket 200 is formed on the inner bottom surface of the chamber 100.

In addition, an idle roller 170 is installed on the support frame 160 so as to assist the rotation of the basket 200. Since the basket 200 is rotatably connected to the drive motor 130 via the shaft, a support element for supporting the basket 200 is not strictly necessary. However, in consideration of the fact that the weight of the basket 200 is applied to the shaft of the drive motor 130, the idle roller 170 may be provided in order to assist the rotation of the basket 200 while distributing the weight of the basket.

In operation, after the chamber 100 is opened using the door cap 110 formed on one side of the chamber, the basket 200 is pulled out, and the basket door 210 is opened so that the object to be processed, such as, for example, coffee beans, is introduced little by little (e.g. in amounts within a range from 100 g to 2 kg). Then, the basket door 210 is closed, the basket 200 is connected to a rotating shaft of the drive motor 130, and the door cap 110 is closed. Thereby, a vacuum is created inside the chamber by the vacuum adjustment device 300, whereby the object to be processed may be roasted. In this way, the roaster, which has a simplified form without requiring a complex door cylinder structure or an opening/closing cylinder structure for automatically supplying or discharging the object to be roasted, may be realized.

The vacuum adjustment device 300 includes the vacuum pump 310 for creating a vacuum or negative pressure inside the chamber by suctioning air or gas inside the chamber 100, the water trap 320 formed on the movement path of air suctioned by the vacuum pump for condensing and storing moisture contained in the suctioned air, and a vacuum gauge 330 formed on the movement path for measuring the vacuum pressure inside the chamber.

Gas generated in the chamber while roasting passes through the filter 180 formed on the chamber so that, for example, fine dust contained in the gas is removed. The gas that has passed through the filter 180 passes through a cooling coil 340 while moving along the movement path connected to the vacuum adjustment device 300 so that the moisture contained in the gas is cooled and condensed, and the condensed gas is collected by the water trap 320.

The vacuum adjustment device 300 may maintain the inside of the chamber at a constant pressure, for example, in the vacuum state or at a negative pressure within a range from 460 mmHg to 760 mmHg while roasting, for example, coffee beans, which may ensure an excellent scent of coffee beans, which are roasted in the vacuum state.

The drive motor 130 is connected to the basket 200 via a rotating shaft 131. Because the basket 200 is rotated in response to the rotation of the rotating shaft 131, the object to be processed, such as, for example, coffee beans, inside the basket is moved, thereby being evenly roasted.

The heater 140 is installed so as to be outwardly spaced apart from one surface of the basket 200 so as to supply heat to the object to be processed, such as, for example, coffee beans, introduced into the basket.

Although the heat supplied from the heater 140 is used to heat the inside of the basket 200 and the entire inside of the chamber, because the basket 200 in which the object to be processed is accommodated is spaced apart from the inner circumferential surface of the chamber 100, in other words, because the basket is separated from the chamber, it is possible to fundamentally prevent the object to be processed from coming into contact with the inner circumferential surface of the chamber at a particular position inside the basket and from burning due to the transfer of an excessive amount of heat thereto, which may ensure the manufacture of coffee having an excellent taste and scent.

As illustrated in FIG. 4, a control panel 400 may be provided outside the chamber 100 and may include, for example, various manipulation units for adjusting the vacuum pressure inside the chamber 100 or for adjusting the roasting time or the roasting temperature.

The control panel 400 may include a motor controller 410 for controlling whether to operate the drive motor 130 or the rotation speed of the drive motor 130, a temperature controller 420 for controlling the driving of the heater so as to set the roasting temperature, and a time controller 430 for setting the roasting time.

At this time, the control panel may be configured to allow the user to manually set and adjust the vacuum pressure inside the chamber, or may be configured so that the vacuum pressure is automatically adjusted within a preset vacuum pressure range depending on the amount of the object to be roasted.

As described above, when the user manipulates, for example, the motor controller, the temperature controller and the time controller, which are exposed to the outside, for example, in order to roast coffee beans in an amount within a range from 100 g to 2 kg, the roasting time may be set to a range from 60 minutes to 120 minutes, the roasting temperature may be set to a range from 60 to 150 degrees Celsius, and the vacuum pressure may be set to a negative pressure within a range from 460 mmHg to 760 mmHg.

In the state in which the vacuum pump 310 of the vacuum adjustment device 300 is driven based on the set values described above so as to maintain the vacuum state, i.e. maintain a constant negative pressure, the heater 140 and the drive motor 130 are driven to rotate the basket 200 while applying heat required for roasting, whereby heat is evenly transferred to the object to be processed, such as, for example, coffee beans, so as to enable the roasting of the object.

At this time, gas generated from, for example, the coffee beans while roasting is discharged from the chamber by the suction force of the vacuum pump 310 and is cooled by a cooling device, such as the cooling coil 340, and thereafter is condensed and stored in the water trap 320.

Although the driving of the vacuum pump 310 and the heater 140 ends when the roasting for a preset time ends, the drive motor 130 is slowly rotated until the object to be processed, such as, for example, coffee beans, is naturally cooled at room temperature, thereby allowing byproducts, such as husks, to be separated from the coffee beans. Thereafter, when the cooling is completed, the door cap 110 and the basket door 210 are opened to allow the user to collect the object to be processed, i.e. coffee beans, and to discard impurities, such as husks, from the dust box 150. In this way, the roasting ends.

Meanwhile, although the shape of the chamber 100 according to the embodiment is not particularly limited, the chamber 100 may be a cylindrical chamber having a circular cross section. This will be described below with reference to FIG. 5.

In FIG. 5, (a) illustrates the case where the cross section of the chamber 100 has a polygonal shape. When the cross section of the chamber 100 has a polygonal shape as illustrated in (a) of FIG. 5, the entire chamber has a polygonal column shape.

When the vacuum adjustment device 300 creates a vacuum inside the chamber having a polygonal column shape, because the inside of the chamber is in the vacuum state, but the outside of the chamber is in the atmospheric pressure state, pressure is applied to the surface of the chamber. With this pressure, as illustrated in (b) of FIG. 5, the phenomenon by which the lower surface of the chamber swells occurs. The inventor was able to determine from experimentation that the lower surface of the chamber swells when the vacuum is created inside the chamber having a polygonal column shape as described above.

Meanwhile, the inventor has found as the result of creating a vacuum in a cylinder that a chamber having a cylindrical shape does not swell, unlike illustration of (b) of FIG. 5.

This is because, although pressure is applied to the surface of the chamber having a cylindrical shape in the same manner as the chamber having a polygonal shape in the state in which the inside of the chamber is in the vacuum state and the outside of the chamber is in the atmospheric pressure state, the pressure caused by the pressure difference may be evenly distributed to the surface of the cylindrical chamber, whereby the shape of the chamber may be maintained.

Accordingly, the chamber according to the embodiment may be a cylindrical chamber having a circular cross section.

With the vacuum roaster according to the embodiment described above, for example, coffee beans may be roasted without burning in a vacuum state or at a negative pressure that may be simply realized using a vacuum pump. In addition, gas that may be generated while roasting is suctioned by the suction force of the vacuum pump, and thereafter is condensed and stored in a water trap, which may minimize the generation of unpleasant gases and may enable the precise adjustment of the temperature at which the coffee beans are to be roasted by a heater.

In addition, without requiring an expensive large roaster having a large volume and a complicated structure, a roaster may be constructed in a small space at low cost and may be simply used.

In addition, after the roasting performed by the heating of the heater ends, cooling at the room temperature may be successively performed inside the chamber, and byproducts, such as husks, generated upon roasting may be naturally discharged from the chamber without a separate process or device while the cooling is performed, which may improve the efficiency of roasting.

Meanwhile, when the chamber is a cylindrical chamber, the pressure resulting from the difference in pressure between the inside and the outside of the chamber while a vacuum is created in the chamber is evenly distributed to the cylindrical surface, whereby the shape of the chamber may be maintained.

Although the presently described embodiments have been described above, modifications and variations can be made via additions, modifications and omission of constituent elements by those skilled in the art without departing from the gist of the appended claims. Thus, it is intended that the modifications and variations should not be understood independently of the technical sprit or prospect of the disclosure.

The invention claimed is:

1. A vacuum roaster comprising:
    a chamber;
    a door cap formed on one side of the chamber so as to be opened or closed;
    a vacuum cap formed on an opposite side of the chamber;
    a basket spaced apart from an inner circumferential surface of the chamber, and including a basket door that is opened or closed for introduction and discharge of an object to be processed;
    a vacuum adjustment device for adjusting a vacuum state inside the chamber;
    a drive motor connected to the basket via a shaft for rotating the basket;
    a heater provided inside the chamber so as to be spaced apart from the basket, and
    a cooling coil formed in a coil shape for lengthening the movement path, the cooling coil serving to cool the air moving in the movement path,
    wherein the vacuum adjustment device includes:
        a vacuum pump for suctioning air inside the chamber;
        a water trap formed on a movement path of the air suctioned by the vacuum pump for condensing and collecting moisture contained in the suctioned air; and
        a vacuum gauge formed on the movement path for measuring a vacuum pressure inside the chamber.

2. The vacuum roaster according to claim 1, wherein the basket is provided in an outer circumferential surface thereof with a discharge hole for discharging a byproduct of the object to be processed, which is generated while the object to be processed is being roasted.

3. The vacuum roaster according to claim 2, wherein the discharge hole is formed to have a diameter within a range from 1 mm to 10 mm.

4. The vacuum roaster according to claim 2, wherein the basket is provided thereunder with a dust box in which the byproduct of the object to be processed, which is discharged through the discharge hole, accumulates.

5. The vacuum roaster according to claim 1, further comprising a filter formed inside the chamber for removing fine dust contained in gas generated inside the chamber.

6. The vacuum roaster according to claim 1, wherein the chamber is a cylindrical chamber having a circular cross section.

7. The vacuum roaster according to claim 2, wherein the chamber is a cylindrical chamber having a circular cross section.

8. The vacuum roaster according to claim 3, wherein the chamber is a cylindrical chamber having a circular cross section.

9. The vacuum roaster according to claim 4, wherein the chamber is a cylindrical chamber having a circular cross section.

10. The vacuum roaster according to claim 1, wherein the chamber is a cylindrical chamber having a circular cross section.

11. The vacuum roaster according to claim 1, wherein the chamber is a cylindrical chamber having a circular cross section.

12. The vacuum roaster according to claim 5, wherein the chamber is a cylindrical chamber having a circular cross section.

* * * * *